April 25, 1967

J. M. KRAMER 3,315,990

VIBRATION DAMPING CONNECTOR FOR CONDUITS

Filed April 6, 1964

INVENTOR.
JACK M. KRAMER
BY Lyon Lyon
ATTORNEYS

United States Patent Office 3,315,990
Patented Apr. 25, 1967

3,315,990
VIBRATION DAMPING CONNECTOR FOR CONDUITS
Jack M. Kramer, Los Alamitos, Calif., assignor to General Connectors Corporation, Burbank, Calif., a corporation of California
Filed Apr. 6, 1964, Ser. No. 357,729
1 Claim. (Cl. 285—231)

This invention relates to vibration damping connector for conduits, and has particular application to the damping of various conduits required in aircraft. Included in the objects of this invention are:

First, to provide a vibration damping connector which permits limited axial and angular displacement of the conduits connected thereby, one of which may be rigidly mounted to the aircraft frame or component thereof.

Second, to provide a vibration damping connector which also forms a dependable seal, and in this regard utilizes effectively the high temperature seal shown in my copending application, Ser. No. 211,264, filed July 20, 1962, now Patent No. 3,206,229 for Flexible Sealed Connector.

Third, to provide a vibration damping connector which incorporates a novelly arranged locking clip to prevent accidental separation of the connector, but which may be readily removed when desired.

With the above and other objects in view, as may appear hereinafter, reference is directed to the accompanying drawings in which.

Figure 1:
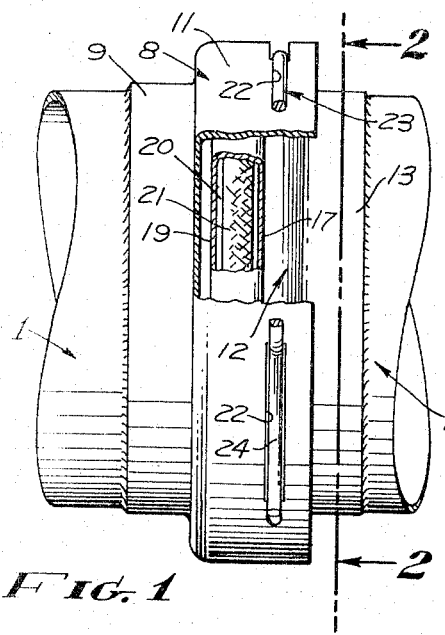
FIG. 1 is a side view of the vibration damping connector with portions shown in section and shown connected to a confronting conduit, the conduit being shown fragmentarily.
Figure 2:
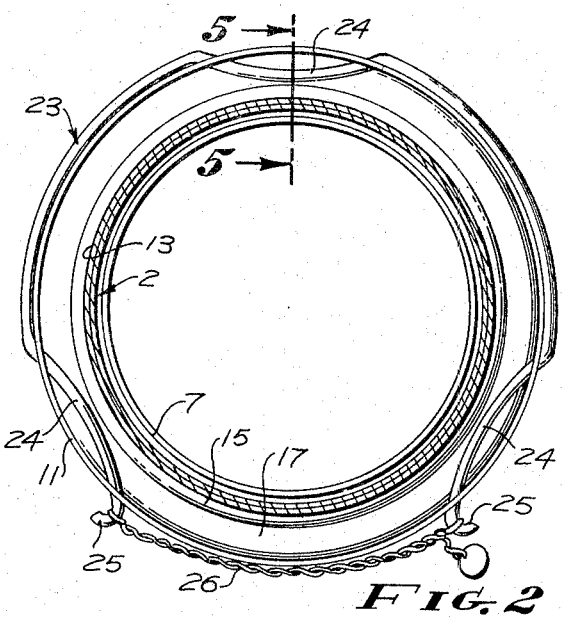
FIG. 2 is a transverse sectional view taken through 2—2 of FIG. 1.
Figure 3:
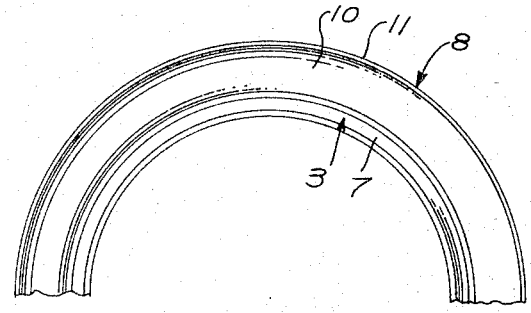
FIG. 3 is a fragmentary end view of one of the components of the connector.
Figure 4:
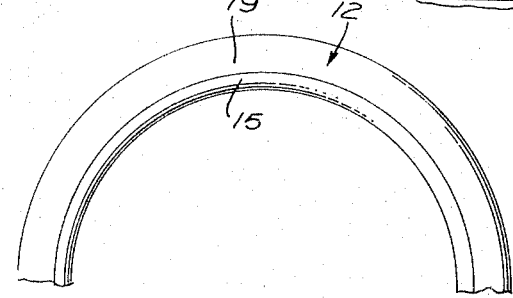
FIG. 4 is a fragmentary end view of the mating component of the connector.

The vibration damping connector is adapted to join conduits 1 and 2 disposed in confronting relation. The conduit 1 may be rigidly secured to the frame structure of an aircraft or to an engine, or other component thereof.

Fitted on the conduit 1 is an extension ring 3 including a band portion 4 initially slidable onto the conduit 1. The band portion 4 is joined to a positioning shoulder 5 adapted to abut the end of the conduit 1, and is in turn joined to an annular extension 6 of the same diameter as the conduit except that its extremity is inturned to form an annular beveled lip 7.

Fitted over the extension ring 3 is a sleeve 8 having a band portion 9 overlying the band portion 4. The two band portions are welded or otherwise secured to each other and to the conduit 1. The band 4 is joined to a radially outwardly extending shoulder 10, which in turn is joined to an axially extending bell portion 11 overlying the extension 6 and concentric therewith.

The other conduit 2 receives an extension ring 12 including a band 13 which is slidable over the end of the conduit 2 and is welded or otherwise secured thereto. The band 13 is joined to an internal positioning rib 14 overlying the end of the conduit 2.

The internal rib 14 merges into a radially outwardly extending shoulder 15, which in turn is joined to an axially outwardly extending intermediate portion 16. The intermediate portion in turn is joined to an outwardly directed shoulder 17, which in turn is joined to an axially directed outer portion 18 terminating in a radially inwardly directed flange 19.

Figure 5:
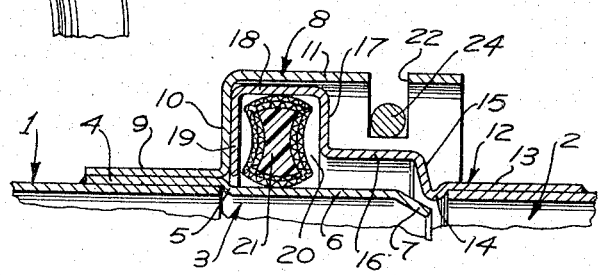
FIG. 5 is an enlarged, fragmentary sectional view taken through 5—5 of FIG. 2.

The shoulder 17, outer portion 18, and flange 19 form an annular, radially inwardly directed channel 20 adapted to receive a seal ring 21. The extension ring 12 together with the seal ring 21 are adapted to fit axially into the annular space formed between the extension ring 3 and bell portion 11 in such a manner that the seal ring 21 sealingly engages the extension 6 as shown in FIG. 5.

The vibration damping connector is particularly intended for use where temperature problems exist, therefore it is preferred to use the special seal ring shown in my copending application Ser. No. 211,264, filed July 20, 1962, now Patent No. 3,206,229 for Flexible Sealed Connector. Essentially, the seal ring comprises an elastomeric core formed preferably of silicone rubber and wrapped with a silicone-impregnated fabric, for example, a glass cloth fabric.

The bell portion 11 is provided in the region axially beyond the seal ring 21 with three equally spaced slots 22. A retainer ring 23 in the form of an open wire loop is adapted to fit around the bell portion 11, and is provided with arcuate depressed portions 24 which fit into the slots 22 so as to prevent withdrawal of the channel portion 20. The retainer ring 23 terminates in hooked ends 25 which are joined by a tie wire 26.

The beveled lip 7 facilitates assembly of the seal ring 21 on the extension 6. Sufficient axial space is provided between the shoulder 10 and the retainer ring 23 to provide an optimum amount of the axial displacement of the conduit 2 with respect to the conduit 1.

Also clearance is provided between the channel 20 and the bell portion 11, and the axial length of the intermediate portion 6 is sufficient to provide clearance between the internal rib 14 and the beveled lip 7, all for the purpose of allowing limited angular displacement of the conduit 1 with respect to the conduit 2.

It will thus be seen that within the needed limits of relative movement the only connection between the two conduits is through the seal ring 21. With this arrangement vibration of the conduit 1 is damped through the seal ring 21 thereby to minimize vibration in the conduit 2.

While a particular embodiment of this invention has been shown and described, it is not intended to limit the same to the exact details of the construction set forth, and it embraces such changes, modifications, and equivalents of the parts and their formation and arrangement as come within the purview of the appended claim.

I claim:

A vibration damping connector for a pair of confronting conduits, said connector comprising:

(a) an extension structure sealingly secured to confronting ends of said conduits;

(b) one of said extension structures defining an elongated axially directed channel portion having radially outer and radially inner cylindrical walls and a radial connecting web, said outer wall having spaced slots therein adjacent its extremity;

(c) a retainer surrounding said extension structure and having retainer portions extending radially inward through said slots;

(d) the other of said extension structures defining a radially inwardly directed channel portion having radially extending parallel walls and an axially directed cylindrical connecting web having a maximum diameter greater than the minimum diameter of said retainer, said radially inwardly directed channel portion fitting freely in said axially directed channel portion between its radially directed web and said retainer portions;

(e) and a sealing ring essentially rectangular in cross section sealingly fitting said radially inwardly directed channel portion and sealingly engaging the radially inner wall of said axially directed channel portion.

References Cited by the Examiner

UNITED STATES PATENTS 2,367,188 1/1945 Anderson _____ 285—7
3,052,491 9/1962 Grass _____ 285—233

FOREIGN PATENTS 75,910 5/1963 Denmark.
877,514 4/1953 Germany.
1,008,881 11/1965 Great Britain.
339,449 6/1959 Switzerland.

CARL W. TOMLIN, *Primary Examiner.*

D. W. AROLA, T. LISLE, *Assistant Examiners.*